(12) United States Patent
Aung et al.

(10) Patent No.: US 12,222,792 B2
(45) Date of Patent: Feb. 11, 2025

(54) SYSTEMS AND METHODS FOR OPTIMIZING BATTERY LIFE IN INFORMATION HANDLING SYSTEMS USING INTELLIGENCE IMPLEMENTED IN STORAGE SYSTEMS

(71) Applicant: DELL PRODUCTS L.P., Round Rock, TX (US)

(72) Inventors: Min Thu Aung, Singapore (SG); Wenhua Li, Singapore (SG); Chai Im Teoh, Singapore (SG)

(73) Assignee: Dell Products L.P., Round Rock, TX (US)

( * ) Notice: Subject to any disclaimer, the term of this patent is extended or adjusted under 35 U.S.C. 154(b) by 63 days.

(21) Appl. No.: 18/110,724

(22) Filed: Feb. 16, 2023

(65) Prior Publication Data

US 2024/0281049 A1 Aug. 22, 2024

(51) Int. Cl.
*G06F 1/3234* (2019.01)
*G06F 1/26* (2006.01)
*G06F 1/3212* (2019.01)
*G06F 1/3225* (2019.01)

(52) U.S. Cl.
CPC ............ *G06F 1/3275* (2013.01); *G06F 1/263* (2013.01); *G06F 1/3212* (2013.01); *G06F 1/3225* (2013.01)

(58) Field of Classification Search
CPC ...... G06F 1/3275; G06F 1/263; G06F 1/3212; G06F 1/3225
USPC ........................................................ 713/323
See application file for complete search history.

(56) References Cited

U.S. PATENT DOCUMENTS

| | | | | | |
|---|---|---|---|---|---|
| 5,167,024 | A | * | 11/1992 | Smith ................... | G06F 1/3287 713/323 |
| 5,832,285 | A | * | 11/1998 | Shimada ............... | G06F 1/3209 713/323 |
| 6,047,380 | A | * | 4/2000 | Nolan ...................... | G06F 1/28 713/502 |
| 6,151,262 | A | * | 11/2000 | Haroun .................... | G11C 7/22 713/300 |

(Continued)

OTHER PUBLICATIONS

Li et al., "Adaptive Memory Device Power Saving Setting in an Information Handling System", U.S. Appl. No. 17/676,456, filed Feb. 21, 2022, 33 pgs.

(Continued)

*Primary Examiner* — Paul R. Myers
(74) *Attorney, Agent, or Firm* — Egan, Enders & Huston LLP.

(57) ABSTRACT

Systems and methods are provided that may be implemented to dynamically change the solid state drive (SSD) power and peripheral component interconnect express (PCIe) link state transition time for solid state drive for SSD operation based on current remaining battery power capacity during a battery-only power mode of an information handling system. In one example, an intelligent algorithm in software and SSD firmware may be implemented that will dynamically change the SSD power and PCIe link state transition based on current remaining battery power capacity during battery-only power mode of an information handling system. In this way additional power saving may be realized when current remaining battery power capacity is low during a battery-only power mode so as to extend the battery life for an information handling system.

24 Claims, 4 Drawing Sheets

(56) References Cited

U.S. PATENT DOCUMENTS

| | | | |
|---|---|---|---|
| 6,155,160 A * | 12/2000 | Hochbrueckner | ........................... G05D 23/1917 250/339.04 |
| 6,571,343 B1 * | 5/2003 | Johnson | .................... G06F 1/28 713/340 |
| 7,378,819 B2 | 5/2008 | Wang et al. | |
| 7,391,184 B2 | 6/2008 | Luo et al. | |
| 7,436,149 B2 | 10/2008 | Luo et al. | |
| 7,595,609 B2 | 9/2009 | Wang et al. | |
| 7,702,938 B2 * | 4/2010 | Ha | ...................... G06F 9/30181 713/340 |
| 8,138,722 B2 | 3/2012 | Wang et al. | |
| 9,300,015 B2 | 3/2016 | Chang et al. | |
| 9,374,789 B2 * | 6/2016 | Weast | ............... H04W 52/0274 |
| 10,496,509 B2 | 12/2019 | Thompson et al. | |
| 2005/0127876 A1 * | 6/2005 | Chuang | .............. G01R 31/3648 320/132 |
| 2005/0276129 A1 * | 12/2005 | Meihong | .............. G11C 29/846 365/200 |
| 2006/0125446 A1 * | 6/2006 | Tupman | ................ G06F 1/3203 320/132 |
| 2006/0143409 A1 * | 6/2006 | Merrell | ................... G06F 1/324 711/146 |
| 2007/0028131 A1 * | 2/2007 | Wang | ............... H04W 52/0261 713/320 |
| 2007/0183216 A1 * | 8/2007 | Chun | ..................... G11C 16/12 365/185.24 |
| 2009/0024858 A1 * | 1/2009 | Hijazi | ....................... G06F 1/30 713/323 |
| 2009/0119527 A1 * | 5/2009 | Kim | ...................... G06F 1/3203 713/323 |
| 2010/0146307 A1 * | 6/2010 | Griffin, Jr. | ............. G06F 1/263 713/300 |
| 2010/0241890 A1 * | 9/2010 | Goodart | ............... G06F 9/4406 713/340 |
| 2011/0202709 A1 * | 8/2011 | Rychlik | ................ G06F 3/0641 711/E12.001 |
| 2011/0276810 A1 * | 11/2011 | Chang | ....................... G06F 1/28 713/300 |
| 2014/0143566 A1 * | 5/2014 | Asano | ................... G06F 1/3212 713/320 |
| 2014/0317424 A1 * | 10/2014 | Akazawa | ................. H04B 5/24 307/104 |
| 2014/0372777 A1 * | 12/2014 | Reller | ................... G06F 13/161 710/305 |
| 2015/0153810 A1 * | 6/2015 | Sasidharan | ............. G06F 1/329 713/320 |
| 2016/0088567 A1 * | 3/2016 | HomChaudhuri | .......................... H04W 52/0274 370/252 |
| 2018/0227832 A1 * | 8/2018 | Da Silva | ........... H04W 52/0216 |
| 2018/0235002 A1 * | 8/2018 | Son | ....................... H04W 28/04 |
| 2019/0317901 A1 * | 10/2019 | Kachare | ................. G06F 3/064 |
| 2019/0340146 A1 * | 11/2019 | Chen | ................... H03K 5/2481 |
| 2019/0356148 A1 * | 11/2019 | Tan | ......................... G06F 3/017 |
| 2022/0216978 A1 * | 7/2022 | Fitzgerald | ............... H04L 12/12 |
| 2023/0031388 A1 * | 2/2023 | Tsien | ................... G06F 1/3287 |
| 2023/0161494 A1 * | 5/2023 | Benisty | ................. G06F 3/0647 711/103 |
| 2024/0041129 A1 * | 2/2024 | Yoshida | .................. A24F 40/65 |

OTHER PUBLICATIONS

Mills, "C State on Intel Processors, What It Is, How It Works and What It Is for", Oct. 28, 2020, 2 pgs.
Intel VTune Profiler User Guide, "User Guide", Version 2023, Dec. 16, 2022, 3 pgs.
Miscrosoft Learn, "NVMe", Aug. 24, 2021, 8 pgs.
NVM Express, "NVMe Technology Power Features", Obtained from Internet Jan. 26, 2023, 5 pgs.
Knowlton, "Making the Most of PCIe Low Power Features", Obtained from Internet Jan. 29, 2023, 2 pgs.
Solomon, "PCI Express Basics & Background", 2014, 45 pgs.
Wikipedia, "State of Charge", Obtained from Internet Jan. 25, 2023, 4 pgs.
Horner, Semiconductor Engineering, "Using PCI Express L1 Substates to Minimize Power Consumption in Advanced Process Nodes", Jul. 10, 2014, 10 pgs.

* cited by examiner

SYSTEMS AND METHODS FOR OPTIMIZING BATTERY LIFE IN INFORMATION HANDLING SYSTEMS USING INTELLIGENCE IMPLEMENTED IN STORAGE SYSTEMS

FIELD OF THE INVENTION

This application relates to operating systems of information handling systems and, more particularly, to battery and system storage of information handling systems.

BACKGROUND

As the value and use of information continues to increase, individuals and businesses seek additional ways to process and store information. One option available to human users is information handling systems. An information handling system generally processes, compiles, stores, and/or communicates information or data for business, personal, or other purposes thereby allowing human users to take advantage of the value of the information. Because technology and information handling needs and requirements vary between different human users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific human user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When a laptop computer system is operating in DC mode and only on battery power (i.e., without battery charging), the remaining battery life of the laptop computer is an important factor that impacts the laptop computer user experience. When the laptop computer battery is low, a user wants to extend the remaining battery life as long as possible until the user has an opportunity to charge the battery.

In conventional systems, a laptop computer user is allowed to configure power usage settings of a laptop computer system to reduce system power consumption while the laptop computer system operates only on battery power.

Firmware is also currently available that executes on the storage driver to optimize the solid state drive (SSD) power usage by using auto power state transition (APST) to lower the SSD power state during idle time on the peripheral component interconnect express (PCIe) connection to the SSD. In this conventional solution, the idle timer or Auto Power State Transition (APST) setting are set by the laptop computer system host processor to a predefined value so that SSD power state and link transition are controlled according to a default fixed predefined setting regardless of the system and battery state of charge (SOC). Thus, this conventional solution uses a fixed setting to transit the non-volatile memory express (NVMe) SSD power state and PCIe link power mode while the laptop computer system operates in battery mode.

Using conventional power reduction solutions, the laptop computer system operates the same way regardless of remaining battery capacity, e.g., the system operates the same way when the battery SOC is 80% as it does when the battery SOC is 20%). SSD power mode management has no link to battery power capacity, and there is no communication channel between the system battery, system embedded controller (EC) and the system SSD.

PCIe link power management affects both SSD power consumption and host power consumption. The PCIe Specification (e.g., L1 PM Substates with CLKREQ, Revision 1.0a, May 30, 2013) defines different link power modes: L0, L0s, L1.0, L1.1 and L1.2 that are managed or controlled by the host root complex. L0 is an active link power mode which consumes highest power with no data latency with both the SSD and system CPU fully powered to communicate across a PCIe link, and L1.2 is the lowest working link power mode with no clock maintained on the PCIe link by the host root complex on the CPU. The L1.2 link power mode has the lowest power consumption, has the greatest data latency, and takes the longest time of any of the different PCIe link power modes to wake up to the L0 link power mode. A host CPU can enter its deepest power saving states (e.g., such as state C10) only if its endpoint device PCIe links are in the L1.2 link power mode.

NVMe power management affects SSD power consumption. The NVMe Specification defines operational power modes and non-operational power modes. In the current conventional implementation, the Idle Time Prior to Transit (ITPT) into a non-operational power mode is set by the laptop computer system host processor to a predefined value.

SUMMARY OF THE INVENTION

Disclosed herein are systems and methods that may be implemented to dynamically change the solid state drive (SSD) power and peripheral component interconnect express (PCIe) link state transition time for solid state drive (SSD) operation based on current remaining battery power capacity during a battery-only operating power mode of an information handling system. In one embodiment, the disclosed systems and methods may be implemented using an intelligent algorithm in software and SSD firmware that will dynamically change the SSD power and PCIe link state transition based on current remaining battery power capacity during battery-only power mode of an information handling system. Using the disclosed systems and methods additional power saving may be realized when current remaining battery power capacity is low during a battery-only power mode (e.g., during which the host operating system continues to execute to receive user input data and to provide output data to the user) so as to extend the battery life for an information handling system in a manner that is not possible for conventional information handling systems which do not have such intelligence to optimize the remaining power of a battery for active system operation.

In one exemplary embodiment, the disclosed systems and methods may be implemented during a battery-only system power mode (i.e., no external power or battery charging is present) to automatically transition a SSD from a relatively higher SSD power mode (e.g., SSD normal power mode) into a relatively lower SSD power mode (e.g., low battery SSD power mode) in order to reduce power consumption upon occurrence of a low battery state of charge (SOC) condition with the host operating system continuing to execute to receive user input data and to provide output data to the user, whether or not input/output (I/O) latency performance of the SSD and the information handling system is impacted. In this exemplary embodiment, the SSD may be automatically transitioned out of the relatively lower low battery SSD power mode to the relatively higher normal SSD power mode when the system battery is no longer in the low battery SOC condition and/or the information handling system is no longer operating in the battery-only power mode.

In one exemplary embodiment, the low battery SSD power mode may prioritize reducing battery consumption (i.e., during occurrence of a low battery SOC condition that is greater than zero SOC during battery-only power mode) over SSD read/write performance when responding with SSD data reads and SSD data writes to host input/output (I/O) data requests (i.e., host read and write requests) received from an operating host programmable integrated circuit during the low battery SSD power mode, regardless of incoming data pattern to the SSD, e.g., incoming data pattern to the SSD may be ignored or not known, and latency may be allowed to increase when the SSD is responding to the host I/O request during the low battery SSD power mode. In this regard, the host programmable integrated circuit may in some embodiments continue to execute a host operating system to execute a host operating system and/or user applications and/or to receive user input during the low battery SSD power mode). In a further exemplary embodiment, any operating SSD I/O data pattern detection counters may be automatically suspended during the low battery SSD power mode (e.g., to prevent any incorrect I/O data pattern detection results), and these counters may be automatically resumed after the SSD exits from the low battery SSD power mode when the battery SOC is no longer in the low battery SOC condition.

In one exemplary embodiment, the disclosed systems and methods may be implemented using device-to-device communications and synchronization (sync) during a low battery SSD power mode to improve information handling system user experience in a manner that is independent of the host operating system (OS) and the storage driver that, in one embodiment, may each continue to actively execute on battery-only power during the low battery SSD power mode. In another exemplary embodiment, the SSD idle time and latency requirement for the host PCIe root complex may be dynamically switched or varied during a low battery SSD power mode to save battery power and to extend the battery life, e.g., in one exemplary embodiment while all or a portion of power-consuming circuitry (e.g., host programmable integrated circuit, display device/s, user I/O device/s such as keyboard, touchpad and/or touch screen, etc.) of the information handling system continues to operate on battery-only power, e.g., to execute user application/s, display video information to a user, receive user input, etc.

In one exemplary embodiment, a SSD may enter a low battery SSD power mode during which conservation of the battery power is prioritized over SSD responsiveness, and hence in the low battery SSD power mode the SSD dynamically reduces its PCIe non-volatile memory express (NVMe) SSD self-idle timer value from the normal operational PCIe NVMe SSD self-idle timer value in order to cause its PCIe link to transition into a lower power mode more frequently than occurs during conventional operation. In this embodiment, the PCIe NVMe SSD self-idle timeout value (i.e., the time before its PCIe link transitions from active mode into deepest power mode) impacts the SSD and overall system responsiveness and power consumption, i.e., the deepest power mode entered with the lowest PCIe link mode state results in the least power consumed with increased SSD latency. However, this reduced power consumption during battery-only operation under a low battery capacity condition allows for increased battery-only system operation time during the low battery SSD power mode, e.g., increased video playback time (such as one hour additional video playback time on a display device while operating on battery-only power in the low battery SSD power mode).

In one exemplary embodiment, the disclosed systems and methods may employ a component-to-component feedback mechanism to improve and prolong system battery life as well as system performance. For example, a direct communication link between a host Embedded Controller (EC), battery controller (e.g., battery management unit "BMU"), and SSD controller may be provided through a data communication bus such as a system management bus (SMBus) or other suitable data communication bus. This direct communication link may be used to synchronize the EC, battery capacity and SSD status in a manner to achieve longer battery life by dynamically changing SSD power management settings, e.g., thus conserving power in a green manner and at the same time improving user experience. This direct communication link may be implemented to provide real time battery power capacity information (e.g., via interface and unique vendor command for SMBus to inform the SSD on current remaining battery capacity value) from the EC to the SSD and host programmable integrated circuit (e.g., CPU) in a manner that reduces battery consumption in low remaining battery capacity condition (e.g., a low battery mode) while the host operating system remains active and continues to operate to receive user input and display video information to the user, without relying on host operating system (OS) settings. This allows, for example, implementation of a SSD low battery mode through EC coordination. In one embodiment, the SSD idle timer may be switched dynamically (e.g., using intelligent component-to-component feedback and a self-learning algorithm) to save power and reduce system power consumption in a way that extends system battery life.

In one exemplary embodiment, the SSD may take the initiative to impact the overall system power consumption based on current status of remaining battery capacity when the SSD PCIe link is in idle mode.

In one exemplary embodiment, the SSD may automatically detect low remaining battery capacity level (e.g., a low battery mode) during battery-only operation when the remaining battery capacity level is less than or equal to a predefined low battery capacity threshold value (e.g., such as 20% SOC value or any other predefined threshold of greater or lesser SOC value that is configurable to any other desired low battery capacity threshold value), through a SMBus unique command or any input/output (IO) configuration. The SSD may then dynamically change the power management policies to aggressively move to a lower SSD power mode with shorter self-idle timeout.

In one respect, disclosed herein is a method that includes operating an information handling system having power-consuming circuitry that is coupled to selectably receive power from an external power source or from one or more internal battery cells of a battery system of the information handling system, the power-consuming circuitry including at least one first programmable integrated circuit coupled to a solid state drive (SSD) by a peripheral component interconnect express (PCIe) link. The method may further include: determining if a current value of a remaining battery capacity of the battery cells is less than or equal to a predefined low battery capacity threshold value while the power-consuming circuitry is currently receiving power only from the internal battery cells of the battery system, and then: operating the SSD in a low battery SSD power mode if the current value of the remaining battery capacity of the battery cells is determined to be less than or equal to the predefined low battery capacity threshold value while the external power source is not providing external power to the power-consuming circuitry of the information handling system, and operating the SSD in a default SSD power mode if the current value of the remaining battery capacity of the battery cells is determined to be greater than the predefined low battery capacity threshold value or if the external power source is providing external power to the power-consuming circuitry of the information handling system; and where the low battery SSD power mode includes first peripheral component interconnect express (PCIe) link power management settings and first non-volatile memory express (NVMe) power settings, and where the operating the SSD in the low battery SSD power mode includes operating the SSD using the first peripheral component interconnect express (PCIe) link power management settings and the first non-volatile memory express (NVMe) power settings; where the default SSD power mode includes different and second peripheral component interconnect express (PCIe) link power management settings and second non-volatile memory express (NVMe) power settings, and where the operating the SSD in the default SSD power mode includes operating the SSD using the second peripheral component interconnect express (PCIe) link power management settings and the second non-volatile memory express (NVMe) power settings; and where the power-consuming circuitry consumes greater power when the SSD operates in the default SSD power mode than when the SSD operates in the low battery SSD power mode.

In another respect, disclosed herein is an information handling system, including: a solid state drive (SSD); a battery system including one or more internal battery cells; power-consuming circuitry that includes at least one first programmable integrated circuit coupled to the SSD by a peripheral component interconnect express (PCIe) link, the power-consuming circuitry being coupled to selectably receive power from an external power source or from the one or more internal battery cells of the battery system; and at least one second programmable integrated circuit programmed to determine if a current value of a remaining battery capacity of the battery cells is less than or equal to a predefined low battery capacity threshold value while the power-consuming circuitry is currently receiving power only from the internal battery cells of the battery system. The at least one second programmable integrated circuit may be programmed to then: operate the SSD in a low battery SSD power mode if the current value of the remaining battery capacity of the battery cells is determined to be less than or equal to the predefined low battery capacity threshold value while the external power source is not providing external power to the power-consuming circuitry of the information handling system, and operate the SSD in a default SSD power mode if the current value of the remaining battery capacity of the battery cells is determined to be greater than the predefined low battery capacity threshold value or if the external power source is providing external power to the power-consuming circuitry of the information handling system. The low battery SSD power mode may include first peripheral component interconnect express (PCIe) link power management settings and first non-volatile memory express (NVMe) power settings, and the at least one second programmable integrated circuit is programmed to operate the SSD in the low battery SSD power mode using the first peripheral component interconnect express (PCIe) link power management settings and the first non-volatile memory express (NVMe) power settings. The default SSD power mode may include different and second peripheral component interconnect express (PCIe) link power management settings and second non-volatile memory express (NVMe) power settings, and the at least one second programmable integrated circuit may be programmed to operate the SSD in the default SSD power mode using the second peripheral component interconnect express (PCIe) link power management settings and the second non-volatile memory express (NVMe) power settings; and the power-consuming circuitry consumes greater power when the SSD operates in the default SSD power mode than when the SSD operates in the low battery SSD power mode.

DESCRIPTION OF ILLUSTRATIVE EMBODIMENTS

Figure 1:
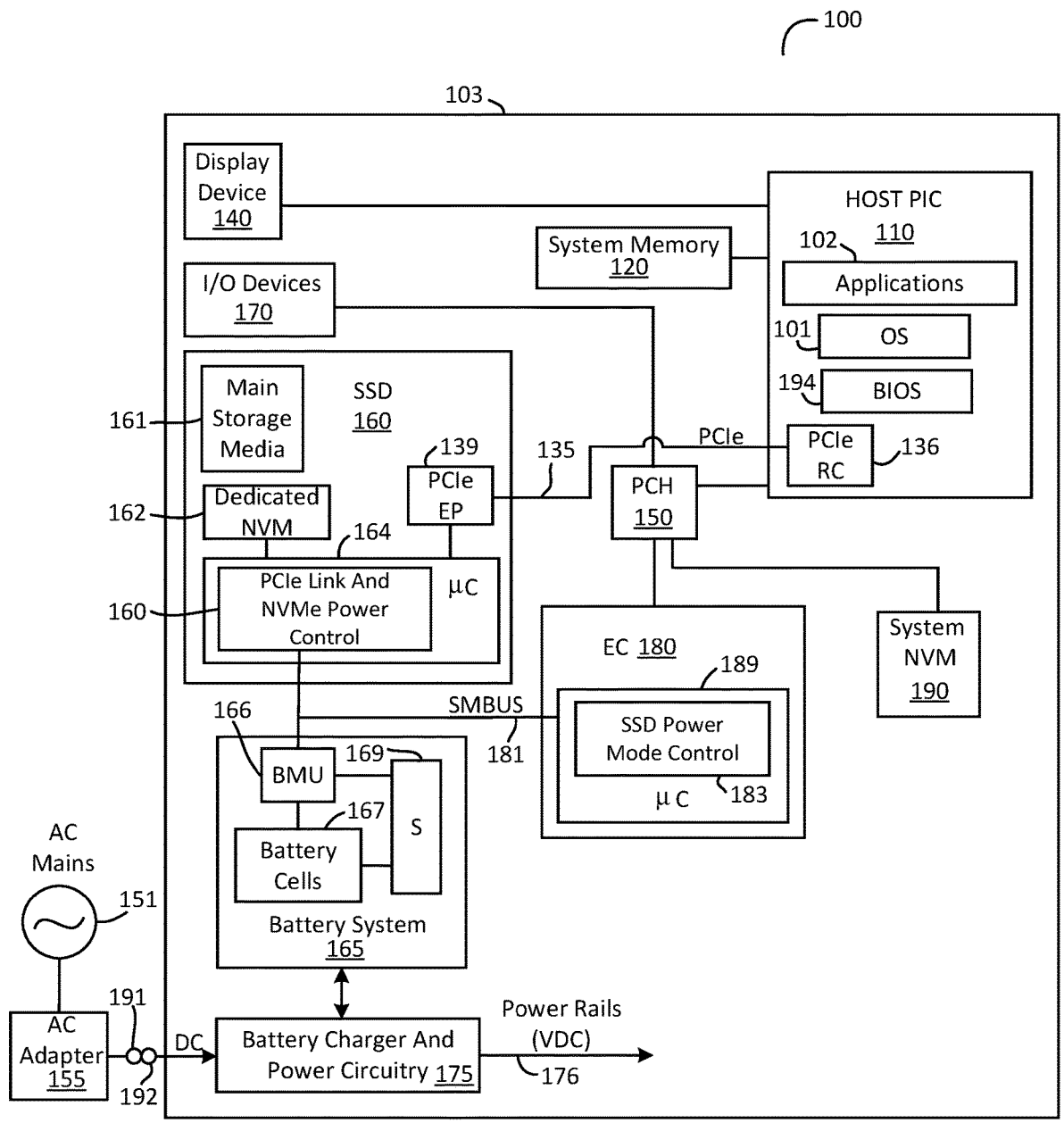
FIG. 1 illustrates a block diagram of battery-powered information handling system according to one exemplary embodiment of the disclosed systems and methods.

FIG. 1 is a block diagram of a battery-powered information handling system 100 (e.g., a client information handling system such as a laptop computer, notebook computer, tablet computer, convertible computer, cell phone, etc.) as it may be configured according to one embodiment of the disclosed systems and methods. In this regard, it should be understood that the configuration of FIG. 1 is exemplary only, and that the disclosed methods may be implemented on other types of information handling systems. It should be further understood that while certain components of an information handling system are shown in FIG. 1 for illustrating embodiments of the disclosed systems and methods, the information handling system is not restricted to including only those components shown in FIG. 1 and described below.

As shown in FIG. 1, information handling system 100 may generally include a host programmable integrated circuit 110 executing an operating system (OS) 101 (e.g., proprietary OS such as Microsoft Windows 10, open source OS such as Linux OS, etc.) and BIOS 194 for system 100, as well as other code such as user software applications 102 (e.g., word processing application, Internet browser, computer game, PDF viewer, spreadsheet application, etc.), etc. In the embodiment of FIG. 1, host programmable integrated circuit 110 may be configured to access non-volatile memory 190 (e.g., serial peripheral interface (SPI) Flash memory) to load and boot part of a system BIOS 194. Host programmable integrated circuit 110 may include any type of processing device, such as an Intel central processing unit (CPU), an Advanced Micro Devices (AMD) CPU or another programmable integrated circuit. Host programmable integrated circuit 110 is coupled as shown to system volatile memory 120, which may include, for example, random access memory (RAM), dynamic RAM (DRAM), synchronous DRAM (SDRAM), etc.

In the illustrated embodiment, host programmable integrated circuit 110 may be coupled to an external or internal (integrated) display device 140 (e.g., LCD or LED display or other suitable display device) depending on the particular configuration of information handling system 100. In such an embodiment, integrated graphics capability may be implemented by host programmable integrated circuit 110 to provide visual images (e.g., a graphical user interface, static images and/or video content) to a system user. However, in other embodiments, a separate programmable integrated circuit (e.g., such as graphics processor unit "GPU") may be coupled between host programmable integrated circuit 110 and display device 140 to provide graphics capability for information handling system 100.

In the exemplary embodiment of FIG. 1, PCH 150 controls certain data paths and manages information flow between certain components of information handling system 100. As such, PCH 150 may include one or more integrated controllers or interfaces for controlling the primary data paths connecting PCH 150 with host programmable integrated circuit 110 and input/output (I/O) devices 170 forming at least a part of a user interface for the information handling system, out-of-band programmable integrated circuit (e.g., embedded controller) 180, and system NVM 190 where BIOS firmware image and settings 197 may be stored together with other components such as ACPI firmware, etc. In one embodiment, PCH 150 may include a Serial Peripheral Interface (SPI) controller and an Enhanced Serial Peripheral Interface (eSPI) controller. In some embodiments, PCH 150 may include one or more additional integrated controllers or interfaces such as, but not limited to, a Peripheral Controller Interconnect (PCI) controller, a PCI-Express (PCIe) controller, a low pin count (LPC) controller, a Small Computer Serial Interface (SCSI), an Industry Standard Architecture (ISA) interface, an Inter-Integrated Circuit (I²C) interface, a Universal Serial Bus (USB) interface and a Thunderbolt™ interface.

As shown in FIG. 1, battery charger and power circuitry 175 is included within information handling system 100 to receive input DC power from multiple power sources, and is coupled to provide regulated DC output power and operating voltage on one or more power rails 176 to various power-consuming components of information handling system 100. Power for information handling system 100 may be provided to battery charger and power circuitry 175 from an external power source (e.g., AC mains 151 through AC adapter 155), and/or from an internal power source in the form of battery system 165 (e.g., a lithium ion ("Li-ion") or nickel metal hydride ("NiMH") smart battery pack). It will be understood that external power may be alternatively provided to information handling system 100 from any other suitable external power source (e.g., such as an external DC power source) or that AC adapter 155 may alternatively be integrated within information handling system 100, e.g., such that AC mains 151 supplies AC power directly to components inside chassis enclosure 103 of information handling system 100. In the illustrated embodiment, AC adapter 155 is removably coupled to, and separable from, battery charger and power circuitry 175 of information handling system 100 at mating interconnection terminals 191 and 192 in order to provide information handling system 100 with a source of DC power to charge battery cells 167 of battery system 165 across power conductor/s 163 and/or to supplement or replace DC power provided across power conductor/s 163 by battery cells 167 of battery system 165.

Battery system 165 (e.g., smart battery or smart battery pack) may include one or more rechargeable batteries (with each battery containing battery cells 167) and a BMU 166 that itself may include, for example, an analog front end ("AFE"), storage (e.g., non-volatile memory) and microcontroller 173. BMU 165 may be coupled to control switching circuitry 169 (e.g., metal-oxide-semiconductor field-effect transistors "MOSFET") within battery system 165 to control flow of discharging current from battery cells 167 and flow of charging current to battery cells 167. BMU 165 may also be coupled via its AFE to sense battery system operating conditions such as remaining battery power capacity (e.g., state of charge), battery current and voltage, etc. Battery charger and power circuitry 175 of information handling system 100 provides output power for power rail/s 176 that power a system load (power-consuming components) of information handling system 100. Battery charger/power circuitry 175 also provides DC power across power conductor/s 163 for charging battery cells 167 of the battery system 165 during battery charging operations. Further information on BMU, battery pack and battery charging operations may be found in U.S. Pat. Nos. 7,378,819, 7,391,184, 8,138,722 and 9,300,015, each of which is incorporated herein by reference in its entirety for all purposes.

As further shown in FIG. 1, a battery system data bus (e.g., system management bus "SMBus") 181 may be coupled to battery system 165 to provide real time and/or stored information (e.g., battery system operating conditions such as state of charge, battery current and voltage) from BMU 166 of battery system 165 to embedded controller (EC) 180. EC 180 may also provide data and/or commands across data bus 181 to BMU 166 of battery system 165 (e.g., to instruct BMU 166 to control operation of switching circuitry 169 within battery system 165).

In one embodiment, battery system 165 may be contained within a cavity of a battery compartment that is defined within chassis enclosure 103 of information handling system 100. In one such embodiment, battery system 165 may be an interchangeable or user-replaceable battery pack that is provided with external power and data connector terminals for contacting and making temporary (e.g., non-soldered) interconnection with mating power connector terminals and data connector terminals provided within the battery pack compartment, e.g., to exchange power through power conductors 163 with battery charger and power circuitry 175 of the information handling system 100, as well as to exchange data across data bus 181 with EC 180 of the information handling system 100. In another embodiment, battery system 165 may be a non-replaceable or permanent battery pack that is enclosed (or captured) within information handling system chassis enclosure 103 and may have power connector terminals and data connector terminals that are optionally soldered to power conductors 163 and data bus 181. Further information with respect to example operation and configuration of battery system 165 may be found, for example, in U.S. Pat. No. 7,595,609, in U.S. Pat. No. 7,436,149, and in U.S. Pat. No. 10,496,509, each of which is incorporated herein by reference in its entirety for all purposes.

As shown, external and/or internal (integrated) I/O devices 170 (e.g., a keyboard, mouse, touchpad, touchscreen, etc.) may be coupled to PCH 150 of system 100 to enable a human user to input data and interact with information handling system 100, and to interact with application programs or other software/firmware executing thereon.

Also shown present in FIG. 1 is local system storage in the form of solid state drive (SSD) 160 that is coupled through PCIe bus (PCIe link) 135 via PCIe endpoint (EP) 139 to PCIe host root complex (RC) 136 of host programmable integrated circuit 110. As shown, SSD 160 includes main system non-volatile storage media provided in the form of solid state drive memory elements 161 for storing code, data, instructions for use by various components (e.g., including host programmable integrated circuit 110) of system 100. SSD 160 also includes a storage system programmable integrated circuit in the form of an integrated microcontroller (µC) 164 that is coupled to integrated dedicated non-volatile memory 162 (e.g., dedicated Flash memory) of SSD 160 that is dedicated for storing data, code and instructions for use by storage system programmable integrated circuit 164. In this regard, dedicated non-volatile memory 162 is separate and different from main system non-volatile storage media 161 that is used for storing user data and other data for system 100. Besides a microcontroller, a storage system programmable integrated circuit 164 may alternatively be another suitable type of programmable integrated circuit, e.g., such as FPGA, ASIC, etc.

In the embodiment of FIG. 1, PCIe bus (PCIe link) 135 provides a communication path between host programmable integrated circuit 110 and system solid state drive (SSD) 160. As shown, host programmable integrated circuit 110 may include an integrated PCIe microcontroller that implements a host PCIe root complex 136 that is coupled via PCIe link 135 to an integrated PCIe endpoint microcontroller 139 of SSD 160, i.e., so as to implement PCIe features and to enable exchange of PCIe communications and data, commands, instructions between host programmable integrated circuit 110 and SSD 160.

As shown in FIG. 1, EC 180 is coupled to PCH 150 and may include integrated microcontroller 189 (or other integrated programmable integrated circuit) that is programmed to perform the tasks of SSD power mode control logic 183 that controls PCIe link power and that controls SSD power mode as described elsewhere herein. EC 180 may also be programmed to execute program instructions to boot information handling system 100, execute thermal system management, etc. EC 180 may include, for example, an integrated microcontroller 189 or other integrated programmable integrated circuit such as microprocessor, ASIC, or programmable logic device "PLD" such as FPGA, complex programmable logic device "CPLD", etc. In one embodiment, integrated programmable integrated circuit 189 of EC 180 may operate as an out-of-band programmable integrated circuit that is separate and independent from in-band host programmable integrated circuit 110 running the host OS 101, and integrated programmable integrated circuit 189 of EC 180 may execute without management of any application or other logic executing on host OS 101.

As shown in the exemplary embodiment of FIG. 1, EC 180 is coupled to PCH 150 via data bus 185, and NVM 190 is coupled to PCH 150 via data bus 195. According to one embodiment, data bus 195 is a Serial Peripheral Interface (SPI) bus, and data bus 185 is an Enhanced Serial Peripheral Interface (eSPI) bus. In the embodiment shown in FIG. 1, NVM 190 may be a SPI Flash memory device that is a shared Flash memory device, which is connected to PCH 150 and EC 180. In such a configuration, PCH 150 provides EC 180 shared access to NVM 190 via eSPI bus 185, SPI bus 195, and various interface and logic blocks included within the PCH 150. As further shown, SMBus 161 also couples microcontroller 189 of EC 180 in data communication with microcontroller 164 of SSD 160.

Figure 2:
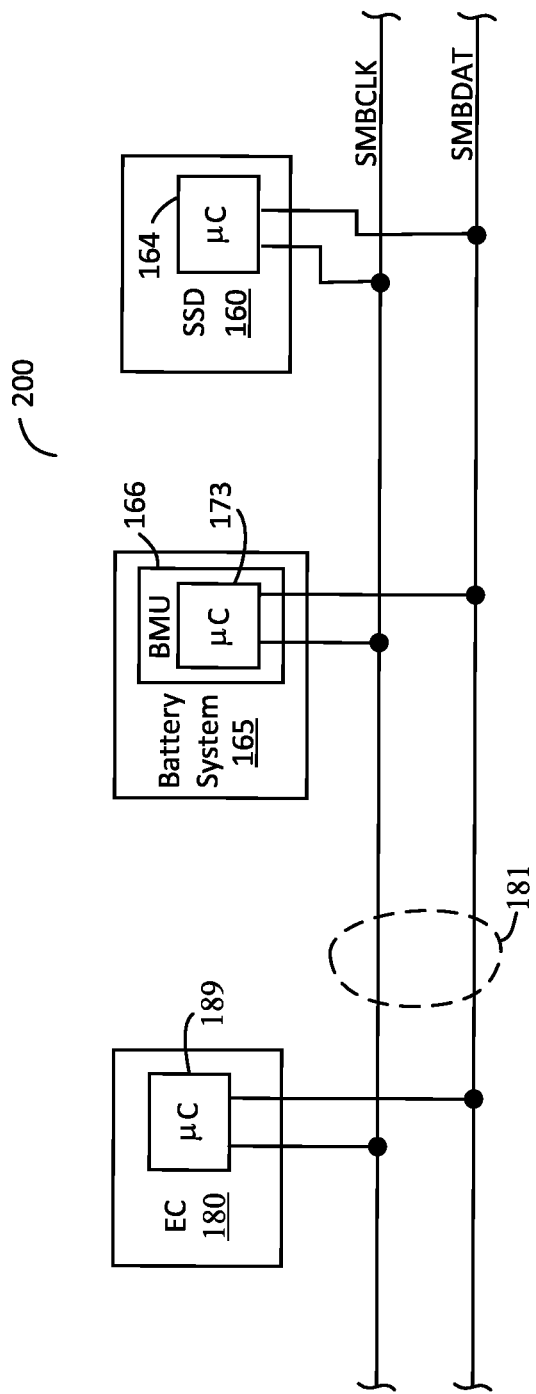
FIG. 2 illustrates a block diagram of circuitry according to one exemplary embodiment of the disclosed systems and methods.

FIG. 2 illustrates a block diagram of circuitry 200 configured to detect battery power capacity (e.g., battery state of charge) and control SSD power mode according to one exemplary embodiment of the disclosed systems and methods. As shown in FIG. 2, EC 180 may be coupled by SMBus 181 to each of BMU 166 (of battery system 165) and SSD 160, and SMBus 181 may include SMBus clock signal (SMBCLK) 210 and SMBus data signal (SMBDAT) 212. In FIG. 2, EC 180 may operate as a SMBus master. In the embodiment of FIG. 2, BMU 166 of battery system 165 detects the remaining power status (e.g., battery SOC) of battery system 165 by making electrical measurements of battery cells 167. In this embodiment, SMBus is a form of I2C protocol that is used to communicate between EC 180, BMU 166 (of battery system 165), and SSD 160.

In the embodiment of FIG. 2, SSD power mode control logic 183 executing on integrated microcontroller 189 of EC 180 periodically polls integrated microcontroller 173 of BMU 166 (e.g., using a unique command identifier) across SMBus 181 to obtain a current value of the remaining battery power capacity (e.g., SOC) of battery cells 167 of battery system 165. Integrated microcontroller 173 of BMU 166 of battery system 165 responds to each such poll event from EC 180 by providing the latest measured remaining battery power capacity value (e.g., SOC) of battery cells 167 of battery system 165 across SMBus 181 to SSD power mode control logic 183 executing on integrated microcontroller 189 of EC 180. As described further herein in relation to FIG. 3, SSD power mode control logic 183 executing on integrated microcontroller 189 of EC 180 then analyzes the latest measured remaining battery power capacity (e.g., SOC) of battery cells 167 of battery system 165 to determine whether or not SSD power mode should be set to low battery SSD power mode or relatively higher SSD power mode. Then based on this determination and the current SSD power mode of SSD 160, integrated microcontroller 189 of EC 180 may provide a command across SMBus 181 to integrated microcontroller 164 of SSD 160 to cause SSD 160 to enter or continue the low battery SSD power mode, or to exit from the low battery SSD power mode, as the case may be.

Figure 3:
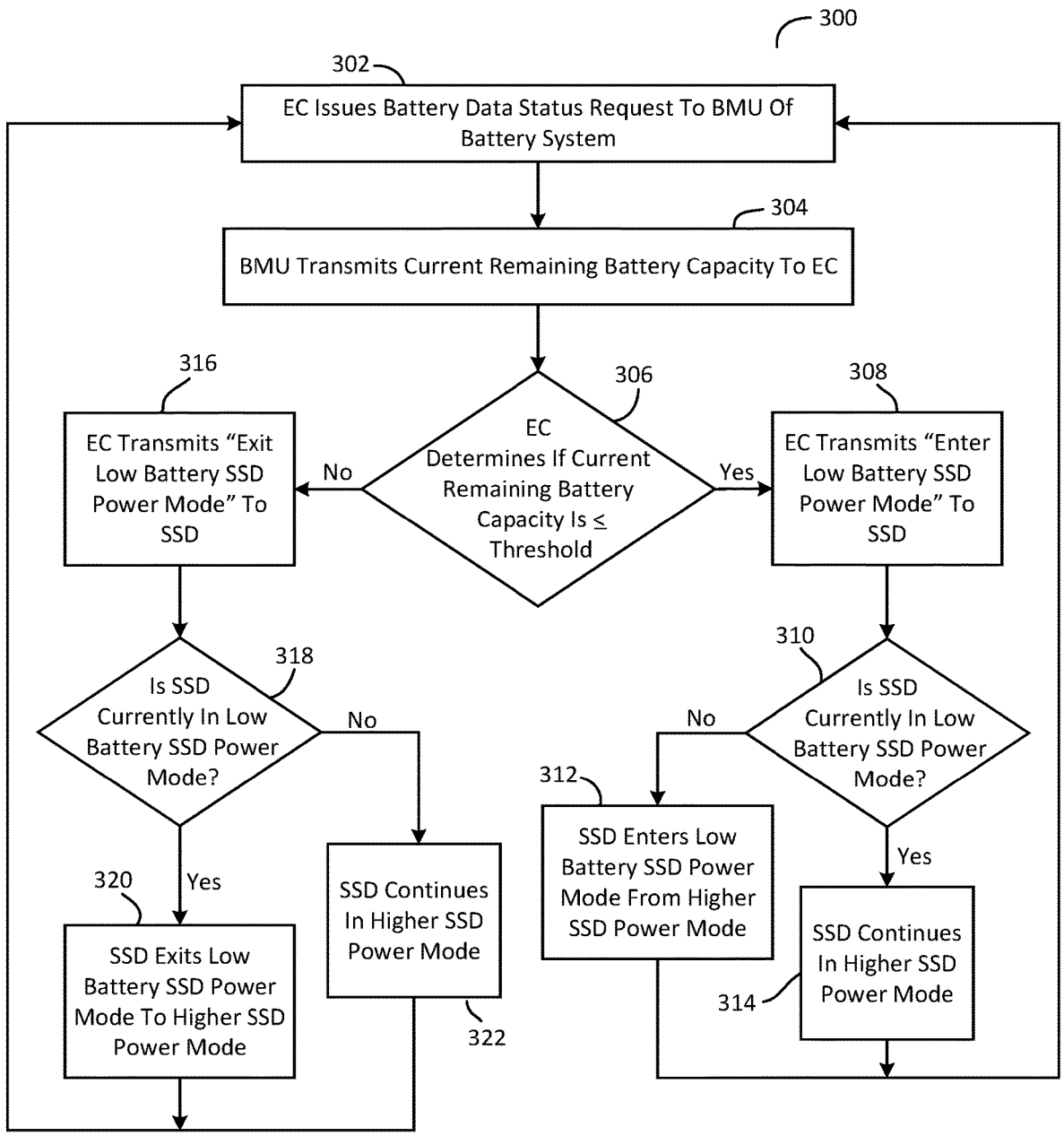
FIG. 3 illustrates methodology according to one exemplary embodiment of the disclosed systems and methods.

FIG. 3 illustrates one exemplary embodiment of a methodology 300 which may be implemented (e.g., by SSD power mode control logic 183 executing on microcontroller 189 of EC 180 and PCIe link and NVMe power control logic 160 executing on microcontroller (µC) 164 of SSD 160) when the current remaining battery capacity is greater than a minimum operating SOC value (e.g., greater than a critical battery level or minimum SOC value such as 5% or any other predefined greater of lesser minimum SOC value) that is required to execute active host OS 101 and/or user application/s 102 on host programmable integrated circuit, to receive user input via I/O devices 170, and to display video information to the user on display device 140. Methodology 300 may be so implemented when the current remaining battery capacity is greater than a critical battery level or minimum operating SOC value to detect current remaining battery power capacity (e.g., battery state of charge) and control SSD power mode based on the current remaining battery power capacity and dynamically change the SSD power mode when needed, e.g., using the circuitry of FIGS. 1 and 2.

Although described only for purposes of illustration with reference to FIGS. 1 and 2, it will be understood that methodology 300 of FIG. 3 may be implemented in a similar manner using any alternative configuration of information handling system circuitry in which a first programmable integrated circuit that is external to a battery system and a solid state drive communicates with a second programmable integrated circuit that is internal to a battery system and a third programmable integrated circuit that is internal to a solid state drive.

Still referring to FIG. 3, methodology 300 begins in block 302 where SSD power mode control logic 183 on EC 183 periodically issues a battery data/status request across SMBus 181 to BMU 166 of battery system 165. SSD power mode control logic 183 may issue this battery data/status request, for example, once every 5 minutes or any other suitable predefined greater or lesser time. In block 304, Microcontroller 173 of BMU 166 of battery system 165 responds across SMBus 181 to each poll request from SSD power mode control logic 183 of EC 180 by transmitting a reply to SSD power mode control logic 183 of EC 180 that includes a report of the current value of the remaining battery capacity of battery cells 167, e.g., SOC expressed in a percentage, where 0%=empty (or no remaining battery capacity) and 100%=full remaining battery capacity.

Next, in block 306, SSD power mode control logic 183 on EC 180 determines if the current value of the remaining battery capacity of battery cells 167 currently reported by BMU 166 is less than or equal to a predefined low battery capacity threshold value (e.g., such as 20% SOC value or any other configurable predefined threshold of greater or lesser SOC value) that is greater than the designated critical battery level or minimum state of charge (e.g., such as 5% or any other predefined greater or lesser minimum state of charge below which information handling system automatically goes into hibernation or shuts down) with no external power currently being provided from AC adapter 155 to battery power and charger circuit 175. If SSD power mode control logic 183 determines in block 306 that the reported current value of the remaining battery capacity of battery cells 167 is less than or equal to the predefined low battery capacity threshold value and no external power is currently being provided from AC adapter 155 to battery power and charger circuit 175, then methodology 300 proceeds to block 308 where SSD power mode control logic 183 on EC 180 transmits a predefined "Enter low battery SSD power mode" power mode command across SMBus 181 to SSD 160.

Figure 4:
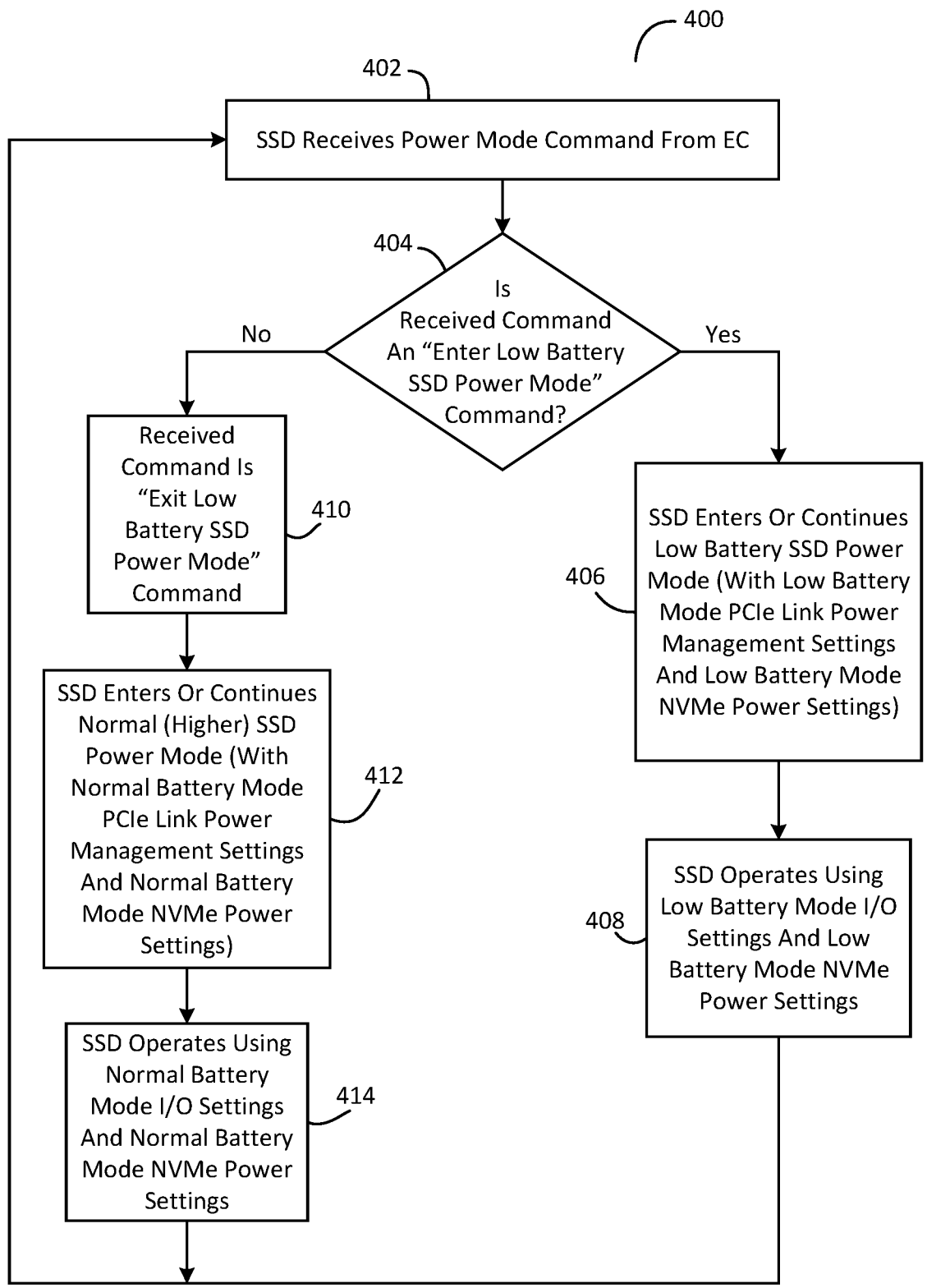
FIG. 4 illustrates methodology according to one exemplary embodiment of the disclosed systems and methods.

If in block 310, SSD 160 is not currently operating in the low battery SSD power mode (i.e., SSD 160 is operating in a SSD power mode that is relatively higher than low battery SSD power mode), then methodology 300 proceeds to block 312 where PCIe link and NVMe power control logic 160 executing on microcontroller (μC) 164 of SSD 160 responds to the "Enter low battery SSD power mode" command of block 308 by causing SSD 160 to enter the low battery SSD power mode which is described further herein in relation to FIG. 4. However, if in block 310 SSD 160 is currently operating in the low battery SSD power mode then methodology 300 proceeds to block 314 where microcontroller (μC) 164 of SSD 160 causes SSD 160 to continue operating in the low battery SSD power mode. Methodology 300 then returns from block 310 or 312 (as the case may be) to block 302 and iteratively repeats as shown.

Returning to block 306, if SSD power mode control logic 183 on EC 180 determines that the reported current value of the remaining battery capacity of battery cells 167 is greater than the predefined low battery capacity threshold value and/or external power is currently being provided from AC adapter 155 to battery power and charger circuit 175, then methodology 300 proceeds to block 316 where SSD power mode control logic 183 on EC 180 transmits a predefined "Exit low battery SSD power mode" power mode command across SMBus 181 to SSD 160. Next, in block 318, if SSD 160 is currently operating in the low battery SSD power mode then methodology 300 proceeds to block 320 where PCIe link and NVMe power control logic 160 on microcontroller (μC) 164 of SSD 160 responds to the "Exit low battery SSD power mode" command of block 308 by causing SSD 160 to exit the low battery SSD power mode to an SSD power mode that is relatively higher than the low battery SSD power mode. However, if in block 318 SSD 160 is currently operating in a SSD power mode that is relatively higher than the low battery SSD power mode, then methodology 300 proceeds to block 322 where PCIe link and NVMe power control logic 160 on microcontroller (μC) 164 of SSD 160 causes SSD 160 to continue operating in the relatively higher SSD power mode. Methodology 300 then returns from block 320 or 322 (as the case may be) to block 302 and iteratively repeats as shown.

It will understood that the particular combination of blocks of methodology 300 is exemplary only, and that other combinations of fewer, additional and/or alternative blocks may be employed that are suitable for detecting current remaining battery power capacity and controlling SSD power mode based on the detected remaining battery power capacity.

FIG. 4 illustrates one exemplary embodiment of a methodology 400 which may be implemented (e.g., by PCIe link and NVMe power control logic 160 on microcontroller 164 of SSD 160) to implement SSD power mode in response to power mode commands received from EC 180 according to methodology 300 of FIG. 3, e.g., using the circuitry of FIGS. 1 and 2. Although described only for purposes of illustration with reference to FIGS. 1 and 2, it will be understood that methodology 400 may be implemented in a similar manner using any alternative configuration of information handling system circuitry in which a first programmable integrated circuit that is external to a battery system and a solid state drive communicates with a second programmable that is internal to a solid state drive.

As shown in FIG. 4, methodology 400 begins in block 402 where PCIe link and NVMe power control logic 160 on microcontroller 164 of SSD 160 receives a predefined power mode command of iterative methodology 300 across SMBus 181 from EC 180. If in block 404 the current received power mode command of block 402 is determined to be an "Enter low battery SSD power mode" power mode command, then methodology 400 proceeds to block 406 where PCIe link and NVMe power control logic 160 on microcontroller 164 of SSD 160 causes SSD 160 to dynamically change to begin (or continue) operating in a low battery SSD power mode having low battery mode PCIe link power management settings and low battery mode NVMe power settings.

After block 406, SSD 160 operates in low battery SSD power mode of block 408 using low battery mode PCIe link power management settings for SSD input/output (I/O) by aggressively transitioning the PCIe link power mode of PCIe link 135 into the L1.2 link power mode in a shorter period of time than is used in normal battery mode in order to reduce power consumption of both the SSD 160 and host programmable integrated circuit 110. In one exemplary embodiment, host programmable integrated circuit 110 may then enter a lower power saving mode or "C-state", and in some cases may enter its deepest power saving modes or "C-states" (e.g., such as C8, C9, C10 states) when applicable to further conserve remaining capacity of battery cells 167. In this regard, host programmable integrated circuit 110 can only enter its deepest power saving modes or C-states (e.g., such as C8, C9, C10 states) if its endpoint device PCIe links are currently in the L1.2 link power mode, i.e., in which no system clock is maintained on PCIe link 135 by host PCIe root complex 136. In another exemplary embodiment, host programmable integrated circuit 110 may operate in a C-state that allows it to continue to execute the host OS 101 and/or user application/s 102 during the low battery SSD power mode of block 408, and SSD 160 may respond to host input/output I/O data requests (i.e., host read and write requests) transmitted from the host programmable integrated circuit 110 during the low battery SSD power mode of block 408.

For example, to preserve limited remaining battery capacity during low battery SSD power mode of block 408, low battery mode PCIe link power management settings may be employed that include a predefined low battery idle timeout value (e.g., a SSD self-idle timer value of 5 milliseconds to 10 milliseconds, SSD self-idle timer value of 10 milliseconds, SSD self-idle timer value of less than 20 milliseconds, etc.) that is less than (or shorter time than) the normal battery idle timeout or SSD self-idle timer value (e.g., 60 milliseconds) while operating in the PCIe Specification (e.g., L1 PM Substates with CLKREQ, Revision 1.0a, May 30, 2013) L0 link power mode (i.e., where both SSD 160 and host programmable integrated circuit 110 have full power to communicate across PCIe link 135) during link idle before transitioning into the L1.2 link power mode. Expiration of this predefined low battery idle timeout value puts SSD 160 reporting as Active Idle, and PCIe link 135 switches to lower link power states of PCIe Specification power modes L1.0/L1.2 to save more battery power consumption. The predefined low battery idle timeout value used during low battery SSD power mode may be less than (or shorter than) the predefined normal battery idle timeout value of the normal battery mode PCIe link power management settings that are employed during normal battery SSD power mode (descried further below). In this way the link power mode of PCIe link 135 may be dynamically controlled by SSD 160, rather than using the conventional technique where the link power mode of a PCIe link is controlled by a host root complex.

In addition to using this relatively shorter predefined low battery idle timeout value in PCIe Specification L0 link power mode, the value of low battery latency tolerance request (LTR) time used by SSD 160 during low battery mode PCIe link power management may be increased (or set to "No Requirement") from the predefined positive normal battery LTR time value (e.g., 150 microseconds) used during normal battery SSD power mode. In this regard, the smaller the LTR value, the faster host PCIe root complex 136 needs to provide the PCIe clock across PCIe link 135 when link power mode transitions from PCIe Specification L1.2 link power mode to L0 link power mode, which obstructs host programmable integrated circuit 110 from entering a deep power saving mode. By setting LTR to be "No Requirement" in one embodiment, host programmable integrated circuit 110 is enabled to enter from its full power C0 state or other relatively higher "C-state" (e.g., such as C6 state) into its relatively lower deep power saving modes or C-states (e.g., such as C8, C9, C10 state) when PCIe link 135 is in the L1.2 link power mode. It will be understood that particular values of low battery idle timeout value and low battery LTR value may be selected for a given implementation to achieve a desired balance between conserving remaining battery capacity of battery cells 167 and maintaining a minimum level of I/O performance for SSD 160.

As an example, in one exemplary embodiment of low battery mode PCIe link power management settings configuration employed during low battery SSD power mode operation of block 408, the LTR value of SSD 160 may be set to "No Requirement" so that host PCIe root complex 136 (and hence host programmable integrated circuit 110 such as CPU) can go to the lowest power modes or C-states (e.g., C8, C9, C10 states). In this exemplary embodiment, the transition of the PCIe link 135 initiates from PCIe Specification L0 link power mode to PCIe Specification L1.0 link power mode (i.e., reduced power state but with system clock maintained on PCIe link 135 by host PCIe root complex 136) when PCIe link 135 is in idle for 10 us, At this time, the clock request (CLKREQ) from SSD 160 to host programmable integrated circuit 110 is de-asserted immediately after the PCIe link 135 enters the PCIe Specification L1 link power mode, and then the PCIe link 135 transitions from PCIe Specification L1 link power mode to PCIe Specification L1.2 link power mode. At this time, host programmable integrated circuit 110 may save power by turning off the PCIe clock (e.g., saving 200 milliwatts) and by entering a deeper host power saving mode to save additional power, e.g., depending on type of host programmable integrated circuit 110 (e.g., type of CPU) and its particular host implementation.

Also in low battery SSD power mode of block 408, PCIe link and NVMe power control logic 160 on microcontroller 164 causes SSD 160 to operate using predefined low battery mode NVMe settings by aggressively transitioning SSD 160 into non-operational power modes during idle time, e.g., by setting a low battery Idle Time Prior to Transit (ITPT) to a smaller (or shorter time) predefined value than a predefined normal battery ITPT value that is used during normal battery SSD power mode (the smaller the value of ITPT setting, the faster SSD 160 transitions from relatively higher powered Active Idle mode (e.g., 400 milliwatts) to relatively lower powered non-operational power mode (e.g., 5 milliwatts) and PCIe link 135 transitions to L1.2 link mode). It will be understood that a particular value of low battery ITPT value may be selected for a given implementation to achieve a desired balance between conserving remaining battery capacity of battery cells 167 and maintaining a minimum level of I/O performance for SSD 160. For example, in one exemplary embodiment, low battery ITPT may be set to be a predefined fixed minimum allowable value during low battery SSD power mode that maximizes the power saving (i.e., minimizes power consumption) while at the same time not causing unbearable I/O latency for SSD 160 (e.g., such as latency that causes replay of video data from SSD 160 to stutter or freeze). This is in contrast to conventional implementations which employ the same fixed ITPT value for transitioning a SSD into non-operational power modes, regardless of the current amount of remaining battery capacity. Methodology 400 then returns from block 408 to block 402 where PCIe link and NVMe power control logic 160 on microcontroller 164 of SSD 160 receives the next predefined power mode command of iterative methodology 300 across SMBus 181 from EC 180.

As an example, in one exemplary embodiment of low battery mode NVMe power settings configuration employed during low battery SSD power mode operation of block 408, ITPT is set to the minimum allowable value (e.g., 10 milliseconds) and any dynamic adjustment of ITPT values based on workload is suspended. Then SSD 160 transitions as soon as possible (e.g., with a 5 milliseconds to 10 milliseconds transition time, a less than 10 milliseconds transition time, a less than 20 milliseconds transition time, etc.) from SSD non-operational NVMe Active Power (ACTP) power state (PS3 or S3) in which some SSD modules (e.g., SSD DRAM volatile memory module/s) remain powered on into deeper non-operational power saving SSD non-operational power mode NVMe ACTP power state (PS4 or S4) in which all SSD modules (e.g., including SSD DRAM volatile memory module/s) are powered off.

This is in contrast to a fixed transition time of 100 milliseconds from PS3 to PS4 that is conventionally employed for SSD operation.

Returning to block 404 of methodology 400, if the current received power mode command of block 402 is determined not to be an "Enter low battery SSD power mode" power mode command (i.e., the current received power mode command of block 402 is determined in block 410 to be an "Exit low battery SSD power mode" power mode command), then methodology 400 proceeds to block 412 where PCIe link and NVMe power control logic 160 on microcontroller 164 of SSD 160 causes SSD 160 to dynamically change to begin (or continue) operating in a higher SSD power mode that is relatively higher (i.e., consumes more power) than the low battery SSD power mode. In one exemplary embodiment described further below, such a relatively higher SSD power mode may be a normal (e.g., default) battery SSD power mode having normal (e.g., default) battery mode PCIe link power management settings and normal (e.g., default) battery mode NVMe power settings that, when implemented, operate to consume more power than the respective low battery mode PCIe link power management settings and low battery mode NVMe settings of block 408 consume when implemented during low battery SSD power mode.

After block 412, methodology 400 proceeds to block 414 where SSD 160 operates in normal battery SSD power mode using normal battery mode PCIe link power management settings for SSD input/output (I/O). Just as an example, during normal battery SSD power mode a predefined normal battery DC mode idle timeout value or SSD self-idle timer value may be used while operating in the PCIe Specification L0 link power mode during link idle before transitioning into the PCIe Specification L1.2 link power mode. This predefined normal battery SSD self-idle timer value (e.g., 60 milliseconds) used during normal battery SSD power mode is longer than the relatively shorter SSD self-idle timer value (previously described) that is used during low battery SSD power mode while operating in the PCIe Specification L0 link power mode during link idle before moving into the PCIe Specification L1.2 link power mode. In one exemplary embodiment, the predefined normal battery SSD self-idle timer value may be selected to achieve maximum (e.g., lowest latency) I/O performance for SSD 160. In one embodiment, host programmable integrated circuit 110 may continue to execute the host OS 101 and/or user application/s 102 during the default SSD power mode of block 414, and at this time SSD 160 may respond to host input/output I/O data requests (i.e., host read and write requests) transmitted from the host programmable integrated circuit 110 during the low battery SSD power mode of block 414.

Also in normal battery SSD power mode operation of block 4149+, PCIe link and NVMe power control logic 160 on microcontroller 164 causes SSD 160 to operate using predefined normal battery mode NVMe settings that operated during idle time to transition SSD 160 into non-operational power modes after occurrence of a longer elapsed time than is the case when using predefined low battery mode NVMe settings of the low battery SSD mode, e.g., by setting a normal battery ITPT to a higher predefined value than the predefined low battery ITPT value that is used during low battery SSD power mode. It will be understood that in one exemplary embodiment a particular value of normal battery ITPT value may be selected for a given implementation to achieve maximum (e.g., lowest latency) I/O performance for SSD 160. Once again, this is contrast to conventional implementations which employ the same fixed ITPT value for transitioning a SSD into non-operational power modes, regardless of the current amount of remaining battery capacity. Methodology 400 then returns from block 414 to block 402 where PCIe link and NVMe power control logic 160 on microcontroller 164 of SSD 160 receives the next predefined power mode command of iterative methodology 300 across SMBus 181 from EC 180.

It will understood that the particular combination of blocks of methodology 400 is exemplary only, and that other combinations of fewer, additional and/or alternative blocks may be employed that are suitable for implementing SSD power mode in response to received power mode commands from a programmable integrated circuit that is external to the SSD.

It will also be understood that one or more of the tasks, functions, or methodologies described herein (e.g., including those described herein for components 101, 102, 110, 136, 139, 140, 150, 155, 160, 164, 165, 166, 170, 173, 175, 180, 183, 189, 194, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more blocks of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more blocks of the present methodologies may be employed in one or more code segments of the computer program. For example, a code segment executed by the information handling system may include one or more blocks of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising operating an information handling system having power-consuming circuitry that is coupled to selectably receive power from an external power source or from one or more internal battery cells of a battery system of the information handling system, the power-consuming circuitry comprising at least one first programmable integrated circuit coupled to a solid state drive (SSD) by a peripheral component interconnect express (PCIe) link; where the method further comprises:
   determining if a current value of a remaining battery capacity of the battery cells is less than or equal to a predefined low battery capacity threshold value while the power-consuming circuitry is currently receiving power only from the internal battery cells of the battery system, and then:
      operating the SSD in a low battery SSD power mode if the current value of the remaining battery capacity of the battery cells is determined to be less than or equal to the predefined low battery capacity threshold value while the external power source is not providing external power to the power-consuming circuitry of the information handling system, and
      operating the SSD in a default SSD power mode if the current value of the remaining battery capacity of the battery cells is determined to be greater than the predefined low battery capacity threshold value or if the external power source is providing external power to the power-consuming circuitry of the information handling system; and
   where the low battery SSD power mode comprises first peripheral component interconnect express (PCIe) link power management settings and first non-volatile memory express (NVMe) power settings, and where the operating the SSD in the low battery SSD power mode comprises operating the SSD using the first peripheral component interconnect express (PCIe) link power management settings and the first non-volatile memory express (NVMe) power settings;
   where the default SSD power mode comprises different and second peripheral component interconnect express (PCIe) link power management settings and second non-volatile memory express (NVMe) power settings, and where the operating the SSD in the default SSD power mode comprises operating the SSD using the second peripheral component interconnect express (PCIe) link power management settings and the second non-volatile memory express (NVMe) power settings;
   where the power-consuming circuitry consumes greater power when the SSD operates in the default SSD power mode than when the SSD operates in the low battery SSD power mode; and
   where the first NVMe power settings comprise a first value of Idle Time Prior to Transit (ITPT) that is less than a second value of ITPT of the second NVMe power settings.

2. The method of claim 1, further comprising then iteratively repeating the determining and operating the SDD in the low battery SSD power mode or the default SSD power mode in each given iteration according to the results of the determining of the given iteration.

3. The method of claim 1, where the at least one first programmable integrated circuit comprises a host programmable integrated circuit executing a host operating system and/or one or more user applications; and where the method further comprises:
   responding, in the SSD, to input/output (I/O) data requests received from the host programmable integrated circuit while the SSD is operating in the low battery SSD power mode and while the SSD is operating in the default SSD power mode.

4. The method of claim 1, where the information handling system further comprises an out-of-band programmable integrated circuit, a battery system programmable integrated circuit, and a SSD programmable integrated circuit; and where the method further comprises:
   receiving, in the out-of-band programmable integrated circuit, the real time value of the remaining battery capacity of the battery cells directly from the battery system programmable integrated circuit;
   then using the out-of-band programmable integrated circuit to perform the determining if the received real time value of the remaining battery capacity of the battery cells is less than or equal to the predefined low battery capacity threshold value;
   then using the out-of-band programmable integrated circuit to transmit a power mode command directly to the SSD programmable integrated circuit based on the results of the determining if the real time value of the remaining battery capacity of the battery cells is less than or equal to the predefined low battery capacity threshold value, the power mode command being a command to operate the SSD in the low battery SSD power mode or a command to operate the SSD in the default SSD power mode;
   then receiving the transmitted power mode command in the SSD programmable integrated circuit; and
   then using the SSD programmable integrated circuit to respond to the received power mode command by performing the operating the SSD in the low battery SSD power mode if the power mode command is a command to operate the SSD in the low battery SSD power mode, and operating the SSD in the default SSD power mode if the command is a command to operate the SSD in the default SSD power mode.

5. The method of claim 4, where the out-of-band programmable integrated circuit is a microcontroller integrated within an embedded controller (EC), where the battery system programmable integrated circuit is a microcontroller integrated within a battery management unit (BMU) of the battery system, and where the SSD programmable integrated circuit is a microcontroller integrated within the SSD.

6. The method of claim 5, where the information handling system further comprises a system management bus (SM-Bus), and where the EC, BMU and SSD are coupled together in direct data communication with each other by the SMBus.

7. The method of claim 1, where the information handling system is a notebook computer; and where the battery system is a smart battery pack.

8. The method of claim 1, where the first PCIe link power management settings comprise a first SSD idle timeout value that is less than a second SSD idle timeout value of the second PCIe link power management settings.

9. The method of claim 8, where the first PCIe link power management settings further comprise a first value of low battery latency tolerance request (LTR) that is either not required or that is greater than a second value of low battery latency tolerance 33. (LTR) of the second PCIe link power management settings.

10. The method of claim 1, where the real time value of the remaining battery capacity of the battery cells is state of charge (SOC) of the battery cells.

11. The method of claim 10, where the predefined low battery capacity threshold value is a low battery SOC condition; and where the method further comprises: automatically suspending SSD I/O data pattern detection counters during the low battery SSD power mode, and automatically resuming the SSD I/O data pattern detection counters after the SSD exits from the low battery SSD power mode and a SOC of the battery cells SOC is not in the low battery SOC condition.

12. The method of claim 1, further comprising dynamically reducing a PCIe non-volatile memory express (NVMe) SSD self-idle timer value when operating the SSD in the low battery SSD power mode.

13. An information handling system, comprising:
a solid state drive (SSD);
a battery system comprising one or more internal battery cells;
power-consuming circuitry that comprises at least one first programmable integrated circuit coupled to the SSD by a peripheral component interconnect express (PCIe) link, the power-consuming circuitry being coupled to selectably receive power from an external power source or from the one or more internal battery cells of the battery system; and
at least one second programmable integrated circuit programmed to determine if a current value of a remaining battery capacity of the battery cells is less than or equal to a predefined low battery capacity threshold value while the power-consuming circuitry is currently receiving power only from the internal battery cells of the battery system, and then:
operate the SSD in a low battery SSD power mode if the current value of the remaining battery capacity of the battery cells is determined to be less than or equal to the predefined low battery capacity threshold value while the external power source is not providing external power to the power-consuming circuitry of the information handling system, and
operate the SSD in a default SSD power mode if the current value of the remaining battery capacity of the battery cells is determined to be greater than the predefined low battery capacity threshold value or if the external power source is providing external power to the power-consuming circuitry of the information handling system; and
where the low battery SSD power mode comprises first peripheral component interconnect express (PCIe) link power management settings and first non-volatile memory express (NVMe) power settings, and where the at least one second programmable integrated circuit is programmed to operate the SSD in the low battery SSD power mode using the first peripheral component interconnect express (PCIe) link power management settings and the first non-volatile memory express (NVMe) power settings;
where the default SSD power mode comprises different and second peripheral component interconnect express (PCIe) link power management settings and second non-volatile memory express (NVMe) power settings, and where the at least one second programmable integrated circuit is programmed to operate the SSD in the default SSD power mode using the second peripheral component interconnect express (PCIe) link power management settings and the second non-volatile memory express (NVMe) power settings; and
where the power-consuming circuitry consumes greater power when the SSD operates in the default SSD power mode than when the SSD operates in the low battery SSD power mode;
where the first NVMe power settings comprise a first value of Idle Time Prior to Transit (ITPT) that is less than a second value of ITPT of the second NVMe power settings.

14. The system of claim 13, where the at least one second programmable integrated circuit is programmed to then iteratively repeat the determining and operate the SDD in the low battery SSD power mode or the default SSD power mode in each given iteration according to the results of the determining of the given iteration.

15. The system of claim 13, where the at least one first programmable integrated circuit comprises a host programmable integrated circuit that executes a host operating system and/or one or more user applications; and where the at least one second programmable integrated circuit is programmed to:
respond, in the SSD, to input/output (I/O) data requests received from the host programmable integrated circuit while the SSD is operating in the low battery SSD power mode and while the SSD is operating in the default SSD power mode.

16. The system of claim 13, where the at least one second programmable integrated circuit comprises an out-of-band programmable integrated circuit, a battery system programmable integrated circuit, and a SSD programmable integrated circuit that are coupled together in direct data communication with each other; and where:
the out-of-band programmable integrated circuit receives the real time value of the remaining battery capacity of the battery cells directly from the battery system programmable integrated circuit, and is programmed to:
then determine if the received real time value of the remaining battery capacity of the battery cells is less than or equal to the predefined low battery capacity threshold value while the power-consuming circuitry is currently receiving power only from the internal battery cells of the battery system;

then transmit a power mode command directly to the SSD programmable integrated circuit based on the results of the determining if the real time value of the remaining battery capacity of the battery cells is less than or equal to the predefined low battery capacity threshold value, the power mode command being a command to operate the SSD in the low battery SSD power mode or a command to operate the SSD in the default SSD power mode;

the SSD programmable integrated circuit receives the power mode command directly from the out-of-band programmable integrated circuit, and is programmed to:

respond to the received power mode command by performing the operating the SSD in the low battery SSD power mode if the power mode command is a command to operate the SSD in the low battery SSD power mode, and operating the SSD in the default SSD power mode if the command is a command to operate the SSD in the default SSD power mode.

17. The system of claim 16, where the out-of-band programmable integrated circuit is a microcontroller integrated within an embedded controller (EC), where the battery system programmable integrated circuit is a microcontroller integrated within a battery management unit (BMU) of the battery system, and where the SSD programmable integrated circuit is a microcontroller integrated within the SSD.

18. The system of claim 17, where the information handling system further comprises a system management bus (SMBus), and where the EC, BMU and SSD are coupled together in direct data communication with each other by the SMBus.

19. The system of claim 13, where the information handling system is a notebook computer; and where the battery system is a smart battery pack.

20. The system of claim 13, where the first PCIe link power management settings comprise a first SSD idle timeout value that is less than a second SSD idle timeout value of the second PCIe link power management settings.

21. The system of claim 20, where the first PCIe link power management settings further comprise a first value of low battery latency tolerance request (LTR) that is either not required or that is greater than a second value of low battery latency tolerance 33. (LTR) of the second PCIe link power management settings.

22. The system of claim 13, where the real time value of the remaining battery capacity of the battery cells is state of charge (SOC) of the battery cells.

23. The system of claim 22, where the predefined low battery capacity threshold value is a low battery SOC condition; and where the at least one second programmable integrated circuit is programmed to: automatically suspend SSD I/O data pattern detection counters during the low battery SSD power mode, and to automatically resume the SSD I/O data pattern detection counters after the SSD exits from the low battery SSD power mode and a SOC of the battery cells SOC is not in the low battery SOC condition.

24. The system of claim 13, where the at least one second programmable integrated circuit is programmed to dynamically reduce a PCIe non-volatile memory express (NVMe) SSD self-idle timer value when operating the SSD in the low battery SSD power mode.

* * * * *